(12) United States Patent
Staneart

(10) Patent No.: US 7,284,738 B1
(45) Date of Patent: Oct. 23, 2007

(54) ADJUSTABLE LUMBER STAND SYSTEM

(76) Inventor: Richard E. Staneart, 2542 E. Fountain, Mesa, AZ (US) 85213

( * ) Notice: Subject to any disclaimer, the term of this patent is extended or adjusted under 35 U.S.C. 154(b) by 151 days.

(21) Appl. No.: 11/177,999

(22) Filed: Jul. 8, 2005

(51) Int. Cl.
 A47F 5/00 (2006.01)
 E04G 25/00 (2006.01)
 F16M 13/00 (2006.01)

(52) U.S. Cl. ............ 248/354.1; 248/351; 248/354.5; 248/159; 248/200.1; 269/61; 269/905; 254/102

(58) Field of Classification Search ........... 248/351, 248/354.1, 354.5, 159, 200.1; 269/61, 905; 254/102
See application file for complete search history.

(56) References Cited

U.S. PATENT DOCUMENTS

| | | | |
|---|---|---|---|
| 1,478,823 A | | 12/1923 | Gauss |
| 1,896,688 A | | 2/1933 | Kolvoord |
| 2,308,142 A | | 1/1943 | Alloway |
| 2,815,861 A | | 12/1957 | Schodorf, Sr. |
| 2,936,849 A | * | 5/1960 | Larson ................ 182/204 |
| 3,266,593 A | | 8/1966 | Okie et al. |
| 3,340,960 A | | 9/1967 | Wilson |
| 3,425,510 A | | 2/1969 | Fedoryk |
| 3,472,338 A | | 10/1969 | Weidman et al. |
| 3,486,580 A | | 12/1969 | Nameche et al. |
| 3,515,244 A | | 6/1970 | Weible |
| 3,719,284 A | | 3/1973 | Rasmusson et al. |
| 3,910,380 A | | 10/1975 | Nameche |
| 4,232,759 A | | 11/1980 | Jacobs |
| 4,278,175 A | | 7/1981 | Jackson |
| 4,280,590 A | | 7/1981 | Polizzi |
| 4,396,092 A | | 8/1983 | Thompson |
| 4,856,749 A | * | 8/1989 | Habermann ............... 248/448 |
| 5,188,331 A | * | 2/1993 | Baines ................... 248/538 |
| 5,358,071 A | | 10/1994 | Stennett |
| 5,524,727 A | | 6/1996 | Yennie, Jr. |
| 5,775,465 A | | 7/1998 | Vossler |
| 6,003,631 A | | 12/1999 | Knauth |
| 6,167,987 B1 | * | 1/2001 | Jensen ................... 182/45 |
| 6,293,058 B1 | * | 9/2001 | Sink ..................... 52/127.1 |
| 6,550,188 B2 | * | 4/2003 | Bolinger et al. ........ 52/127.2 |
| 2002/0084141 A1 | | 7/2002 | Thomas |
| 2003/0141647 A1 | | 7/2003 | Ekern |

* cited by examiner

*Primary Examiner*—Carl D. Friedman
*Assistant Examiner*—Nkeisha J. Dumas
(74) *Attorney, Agent, or Firm*—Schmeiser, Olsen & Watts LLP

(57) ABSTRACT

An adjustable lumber stand system may include a pair of adjustable leg assemblies. Each leg assembly may comprise a first external tubular section into which a second internal section may longitudinally slidably adjust. A pair of base anchors configured to anchor the pair of adjustable leg assemblies may be coupled to lower ends of the first external tubular sections. A pair of adjustable support bracket assemblies may comprise a brace and a support arm configured to support lumber. The first end portions of the support arms and the braces may be coupled to one another and second end portions of the support arms and the braces may be coupled to different locations on the first external tubular sections. A pair of top anchors configured to anchor the pair of adjustable leg assemblies to a structure may be coupled to upper ends of the second internal section.

3 Claims, 7 Drawing Sheets

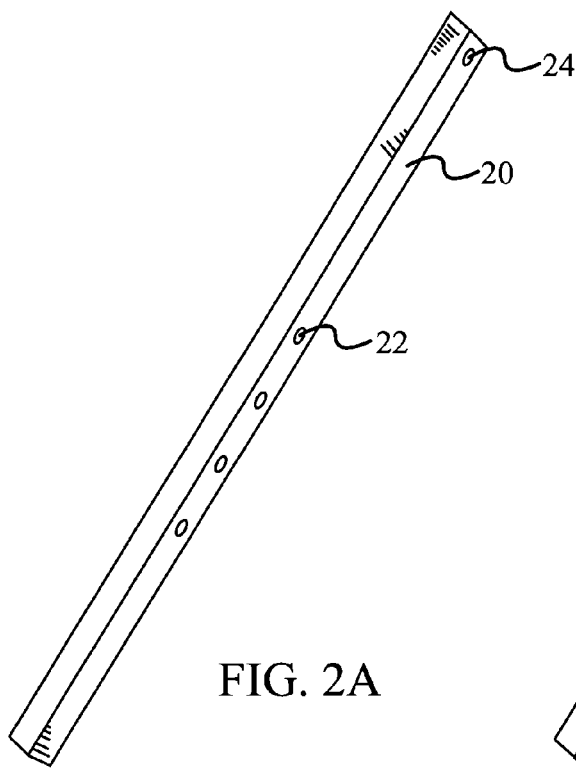
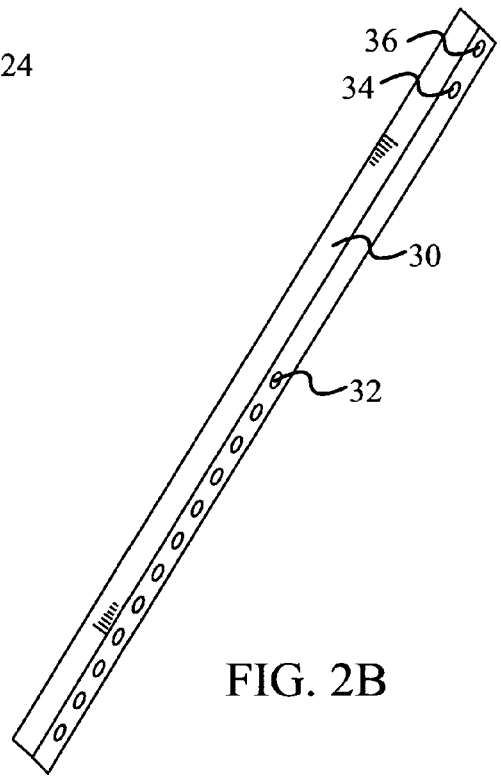
FIG. 2A          FIG. 2B
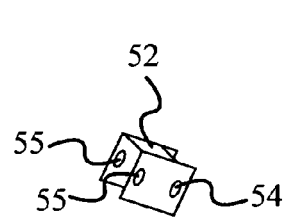
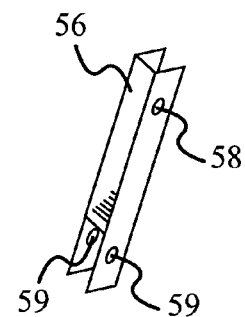
FIG. 2C          FIG. 2D
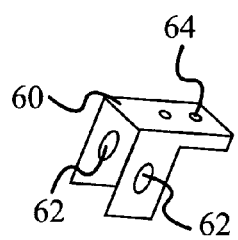
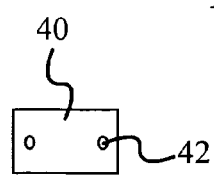
FIG. 2E          FIG. 2F

US 7,284,738 B1

ADJUSTABLE LUMBER STAND SYSTEM

BACKGROUND

1. Technical Field

This document relates to an adjustable lumber stand system.

2. Background Art

Sheeting generally includes manufactured wood or other products that are produced and sold in sheets, such as plywood, particle board, chip board, oriented strand board, medium density fiberboard (MDF), drywall, and other forms of products preformed into sheets. Sheeting is generally sold in sheets that are four feet by eight feet or 4 feet by 12 feet having a designated thickness, although dimensions may vary.

Regardless of the exact dimensions of the sheeting being used, problems persist in installing sheeting, such as on the rafters comprising the roof of a structure under construction for example. Full sheets regularly need to be moved from the ground to the rafters for installation thereon. Typically, a worker on the ground lifts sheeting up to another worker on the roof. The worker on the roof then places the sheeting on a hastily-built, makeshift stand on the rafters to hold the sheeting until it is needed. These makeshift stands are made out of scrap wood typically, and they are notoriously unstable and often collapse under the weight of the sheeting, thereby creating an unsafe working environment. Furthermore, for each structure under construction, a worker must build a new makeshift stand.

Accordingly, what is needed is an adjustable lumber (e.g. sheeting) stand system that safely holds and supports lumber (e.g., standard sized sheeting) at a job site during installation thereof, the system being convenient and easy to assemble, disassemble, store, and transport.

SUMMARY

In an aspect, this document features adjustable lumber stand system. The system may include a pair of adjustable leg assemblies. Each leg assembly may comprise a first external tubular section into which a second internal section may longitudinally slidably adjust. Adjustability may be provided through a series of aligning holes along lengths of the first external tubular section and the second internal section that are configured to receive a securing pin there through. A pair of base anchors configured to anchor the pair of adjustable leg assemblies to the ground for example may also be included. Each base plate anchor may be coupled to a lower end of one of the first external tubular sections. Also included may be a pair of adjustable support bracket assemblies. Each support bracket assembly may comprise a brace and a support arm configured to support lumber (e.g., sheeting). The first end portions of the support arm and the brace may be coupled to one another and second end portions of the support arm and the brace may be coupled to different locations on the first external tubular section. Finally, a pair of top anchors configured to anchor the pair of adjustable leg assemblies to a structure (e.g., rafters of a building under construction) may be included. Each top anchor may be coupled to an upper end of one of the second internal sections.

The foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended DRAWINGS, where like designations denote like elements.

FIGS. 2A-2F are perspective views respectively of components of the leg assembly of FIG. 1;

DESCRIPTION

1. Structure

Figure 1:
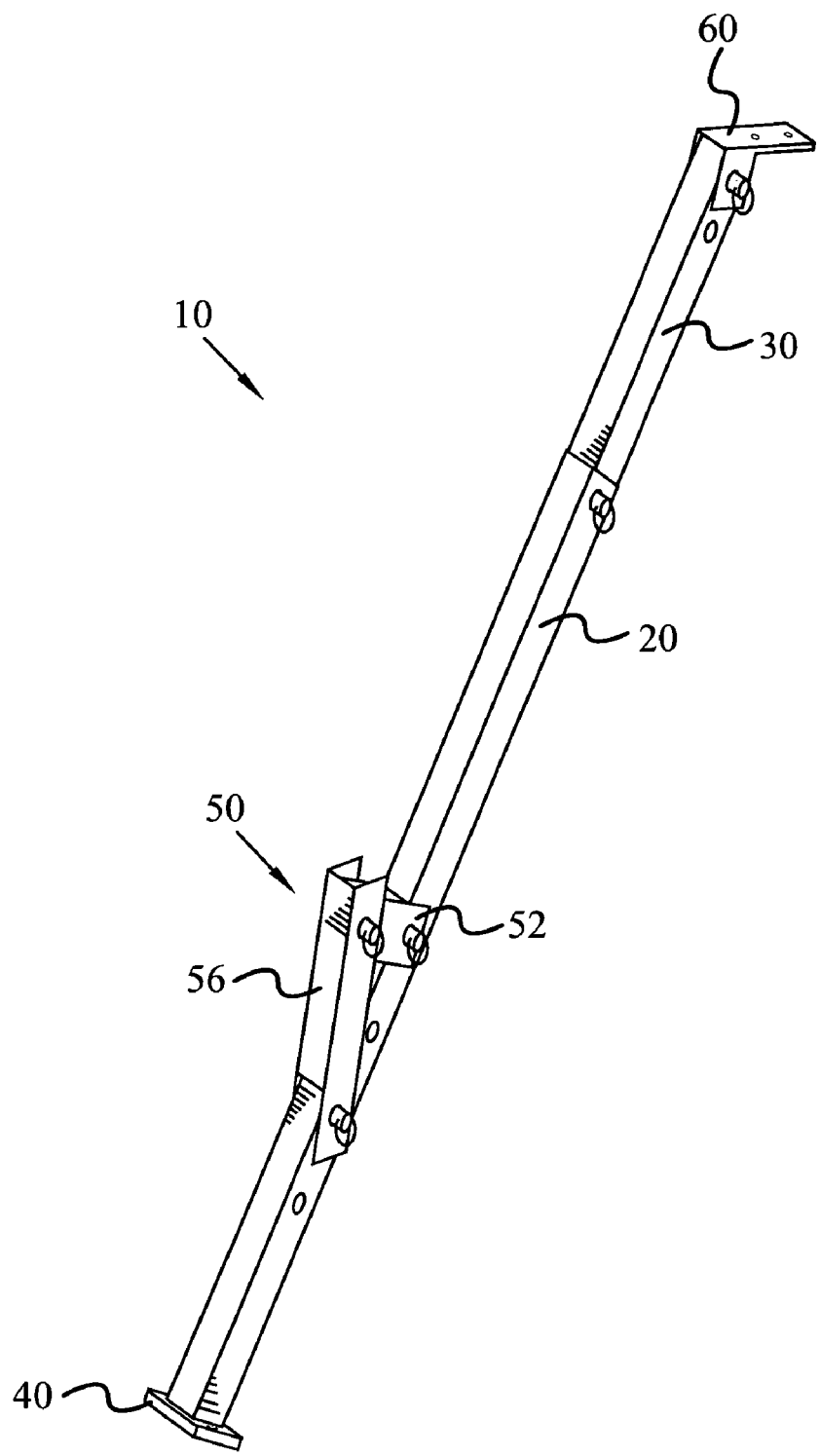
FIG. 1 is a perspective view of an adjustable leg assembly for an adjustable lumber stand system configured according to an embodiment of the present invention.

There are a variety of adjustable leg assembly implementations for adjustable lumber stand system implementations. Notwithstanding, with reference to FIG. 1 and for the exemplary purposes of this disclosure, adjustable leg assembly 10 is an example of an adjustable leg assembly of the invention. Adjustable leg assembly 10 generally includes a first external tubular section 20, a second internal section 30, a base anchor 40, a support bracket assembly 50, and top anchor 60.

Referring to FIG. 2A and describing adjustable leg assembly 10 in greater detail, first external tubular section 20 is configured to slidably receive and engage, and, in some embodiments, removably receive, second internal section 30. First external tubular section 20 may comprise any of various hollow elongated structures of any rectilinear (e.g., square, rectangular, triangular, polygonal, and the like) and/or curvilinear (e.g., circular, segmented, elliptical, and the like) opening profile. For the exemplary purposes of this disclosure, first external tubular section 20 may be an elongated length of square tubing.

Turning to FIG. 2B and describing adjustable leg assembly 10 in greater detail, second internal section 30 may be configured for slidable engagement and, in some embodiments, removable engagement within first external tubular section 20. Accordingly, second internal section 30 may be received at least partially within the first external tubular section 20. Second internal section 30 may comprise any of various solid or hollow elongated structures of any rectilinear (e.g., square, rectangular, triangular, polygonal, and the like) and/or curvilinear (e.g., circular, segmented, elliptical, and the like) profile and/or opening profile depending upon the opening profile shape and size of first external tubular section 20. For the exemplary purposes of this disclosure, second internal section 30 may be a tubular section similar to first external tubular section 20, but slightly smaller so as to at least slidably engage within first external tubular section 20.

First external tubular section 20 and second internal section 30 may each include any number of spaced apart aligning holes configured to facilitate the adjusting, collapsing, and/or securing of leg assembly 10 and/or any component thereof (e.g., support bracket assembly 50). Each aligning hole comprises an aperture that extends through either first external tubular section 20 or second internal section 30 and, with the exception of top anchor aligning hole 36, may align with a corresponding aligning hole in the other section when second internal section 30 is slidably engaged within first external tubular section 20. Accordingly, in some embodiments there may be a series of aligning holes positioned along substantially the entire length of first external tubular section 20 and/or second internal section 30, thereby allowing a wider range in adjustability of second internal tubular section 30 and/or support bracket assembly 50 to accommodate different heights of structures, lumber, and the like for example. In other embodiments there may be aligning holes positioned at different operative locations on first external tubular section 20 and/or second internal section 30. Notwithstanding, for the exemplary purposes of this disclosure, first external tubular section 20 may include a series of support bracket aligning holes 22 between its base-end and open-end portions and adjusting/collapsing aligning hole 24 at its open-end portion. In addition and for the exemplary purposes of this disclosure, second internal section 30 may include a series of adjusting aligning holes 32 extending from its insertion-end and central portions and collapsing aligning hole 34 and top anchor aligning hole 36 at its other end portion.

Figure 5:
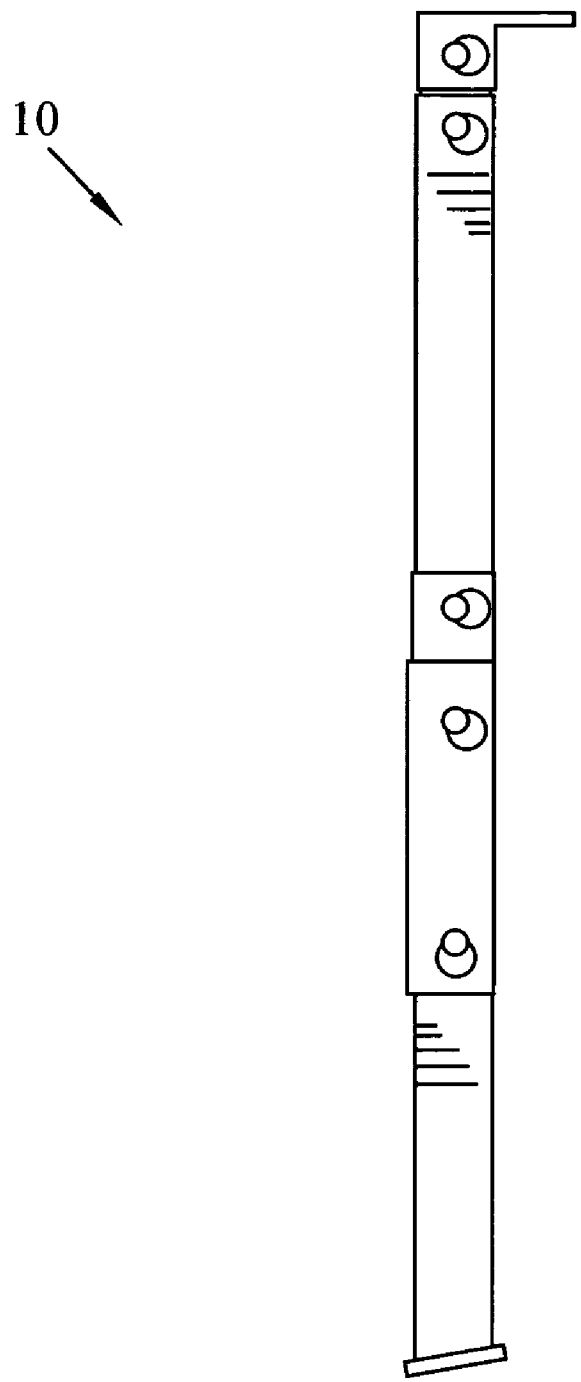
FIG. 5 is a side view of the leg assembly of FIG. 1 during a method of collapsing the same.

Referring to FIG. 2F and describing adjustable leg assembly 10 in greater detail, base anchor 40 is configured to anchor leg assembly 10 to the ground, a structure, or the like. Base anchor 40 may comprise any of various structures of any rectilinear (e.g., square, rectangular, triangular, polygonal, and the like) and/or curvilinear (e.g., circular, segmented, elliptical, and the like) shape. For the exemplary purposes of this disclosure, base anchor 40 may be a rectangular plate with a pair of anchoring holes there through. Base anchor 40 may be coupled to the base-end of first external tubular section 20. As depicted in FIG. 5, base anchor 40 may be coupled at any angle from about 0° to about 45° to external tubular section 20, such as about 10°.

Turning to FIGS. 1 and 2C-2D and describing adjustable leg assembly 10 in greater detail, support bracket assembly 50 may comprise support arm 52 and brace 56. Support arm 52 is configured to support lumber (e.g., sheeting). Support arm 52 may comprise any of various structures of any rectilinear (e.g., square, rectangular, triangular, polygonal, and the like) and/or curvilinear (e.g., circular, segmented, elliptical, and the like) shape. For the exemplary purposes of this disclosure, support arm 52 may comprise a length of channel comprising a spacer plate and opposing sidewalls. Support arm 52 may be slightly larger than first external tubular section 20 to fit over first external tubular section 20. At an external tubular section end portion of support arm 52, the opposing sidewalls extend beyond the spacer plate for allowing support arm 52 to be coupled as described below to first external tubular section 20 and to second internal section 30 when second internal section 30 is slidably engaged within first external tubular section 20. At the external tubular section end portion of support arm 52, the opposing sidewalls may have external tubular section aligning hole 54 there through, while at a brace end portion of support arm 52, the opposing sidewalls may have brace aligning hole 55 there through.

Brace 56 is configured to bear support arm 52. Brace 56 may comprise any of various structures of any rectilinear (e.g., square, rectangular, triangular, polygonal, and the like) and/or curvilinear (e.g., circular, segmented, elliptical, and the like) shape. For the exemplary purposes of this disclosure, brace 56 may comprise a length of channel comprising a spacer plate and opposing sidewalls. Brace 56 may be slightly larger than first external tubular section 20 and support arm 52 to fit over them. At an external tubular section end portion of brace 56, the opposing sidewalls extend beyond the spacer plate for allowing brace 56 to be coupled as described below to first external tubular section 20 and to second internal section 30 when second internal section 30 is slidably engaged within first external tubular section 20. At the external tubular section end portion of brace 56, the opposing sidewalls may have external tubular section aligning hole 59 there through, while at a support arm end portion of brace 56, the opposing sidewalls may have support arm aligning hole 58 there through.

First end portions of support arm 52 and brace 56 may be coupled or removably coupled to one another and external tubular section end portions of support arm 52 and brace 56 may be coupled or removably coupled to first external tubular section 20 and to second internal section 30 when second internal section 30 is slidably engaged within first external tubular section 20. These couplings may be pivotal couplings.

Referring to FIG. 2E and describing adjustable leg assembly 10 in greater detail, top anchor 60 is configured to anchor leg assembly 10 to a structure (e.g., rafters of a building). Top anchor 60 may comprise any of various structures of any rectilinear (e.g., square, rectangular, triangular, polygonal, and the like) and/or curvilinear (e.g., circular, segmented, elliptical, and the like) shape. For the exemplary purposes of this disclosure, top anchor 60 may have a channel-shaped profile and comprise a spacer plate and opposing sidewalls. Top anchor 60 may be slightly larger than second internal section 30 to fit over second internal section 30. The spacer may have at least one securing hole 64 through a distal free end portion thereof. The opposing sidewalls may be coupled to a proximal end portion of the spacer and may have internal section aligning hole 62 there through. Top anchor 60 may be coupled or removably coupled to the anchoring-end portion of second internal section 30. This coupling may be a pivotal coupling.

Figure 3:
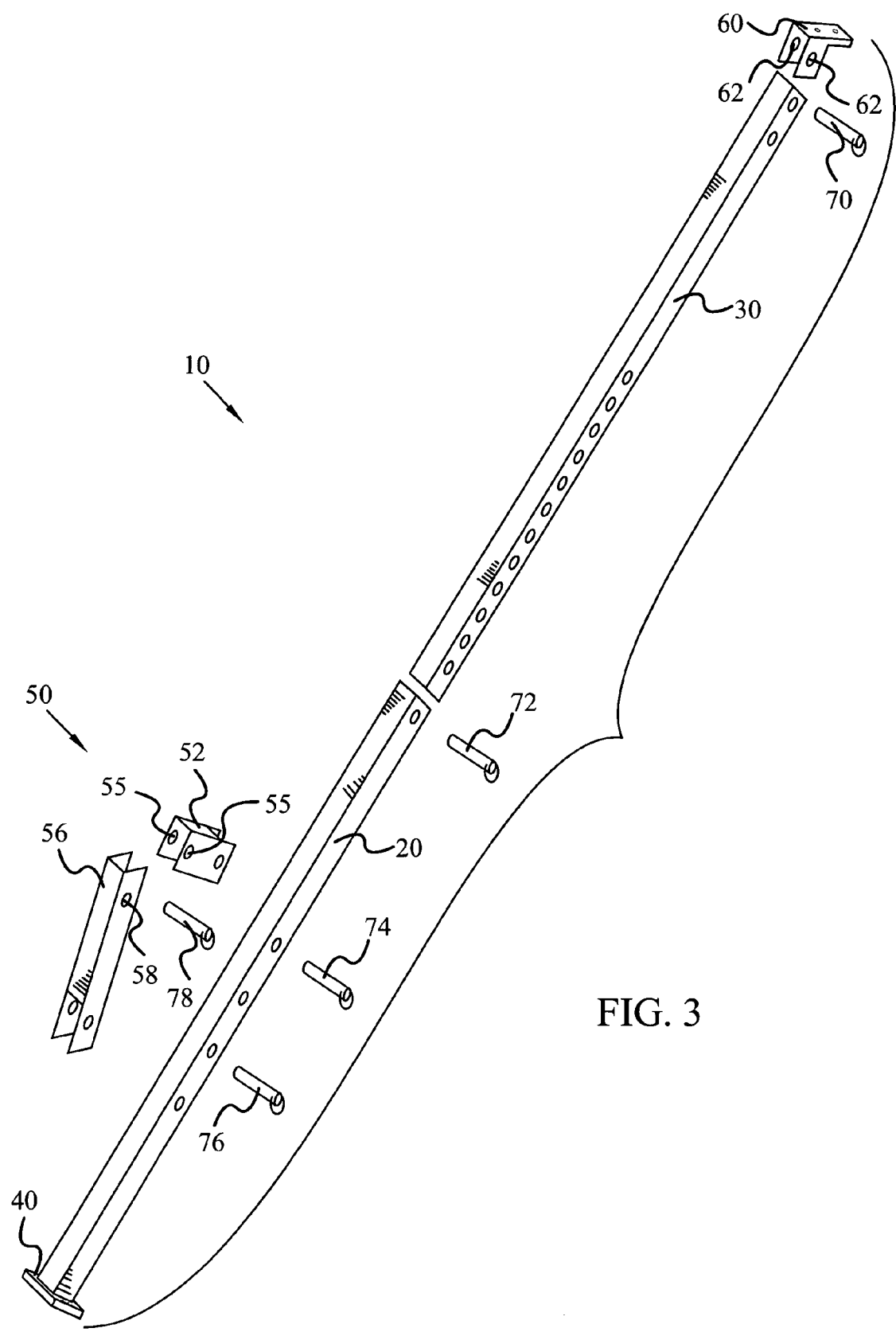
FIGS. 3-4 are exploded perspective views of the leg assembly of FIG. 1 during a method of assembling the same.

Any aligning hole may be configured to removably slidably receive a corresponding securing pin. Once a securing pin is received through the aligning hole, a cotter pin may be used to retain the securing pin in place, or the securing pin may have any other retaining mechanism to hold the securing pin its operative position, such as an integrated detent (e.g., ball) at an insertion end portion thereof. Referring to FIG. 3 and for the exemplary purposes of this disclosure, securing pins may include top anchor securing pin 70, adjusting/collapsing securing pin 72, and support bracket securing pins 74, 76, 78, each of which comprising a detent ring securing pin.

Many additional implementations are possible and are within the CLAIMS.

2. Specifications Materials Manufacture, and Assembly

It will be understood that implementations are not limited to the specific leg assemblies and components disclosed herein, as virtually any components consistent with the intended operation of an adjustable leg assembly implementation may be utilized. Accordingly, for example, although particular leg assemblies, external tubular sections, internal sections, base anchors, support bracket assemblies, support arms, braces, top anchors, holes, securing pins, tubing, plates, spacers, sidewalls, and other components are disclosed, such components may comprise any shape, size, style, type, model, version, class, grade, measurement, concentration, material, weight, quantity, and/or the like consistent with the intended operation of an adjustable leg assembly. Implementations are not limited to uses of any specific components, provided that the components selected are consistent with the intended operation of an adjustable leg assembly.

Accordingly, for the exemplary purposes of this disclosure, first external tubular section 20 may comprise about 1¼", 0.083 gauge, square tubing having a length of about 7'6" with a series of 9/32" support bracket aligning holes 22 about 8" center to center starting from about 30" up from the base of section 20. Second internal section 30 may comprise about 1", 0.120 gauge, square tubing having a length of about 7'6" with a series of 9/32" adjusting aligning holes 32 about 4" center to center starting from about 4" up from the base of section 30. Base anchor 40 may comprise about a 2" by 4½" by ¼" plate with two 3/16" opposing spaced apart securing holes 42 there through. Support arm 52 may comprise about 1¾", 0.083 gauge, channel having a length of about 19" with two 9/32" aligning holes 58 and 59 spaced apart about 16" center to center, aligning hole 58 starting from about 2¼" up from the brace end portion of support arm 52 and aligning hole 59 starting from about ¾" up from the external tubular section end portion of support arm 52. Brace 56 may comprise about 1½", 0.083 gauge, channel having a length of about 9½" with two 9/32" aligning holes 54 and 55 spaced apart about 8" center to center. Top anchor 60 may comprise about 1½", 0.083 gauge, channel having a length of about 6" with a 9/32" aligning hole 62 through the sidewalls and a pair of 3/16" spaced apart securing holes 64 through a distal free end portion of the spacer.

The components defining any adjustable leg assembly implementation may be formed of any of many different types of materials or combinations thereof that can readily be formed into shaped objects provided that the components selected are consistent with the intended operation of an adjustable leg assembly implementation. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Accordingly, for the exemplary purposes of this disclosure, each component of adjustable leg assembly 10, namely first external tubular section 20, second internal section 30, base anchor 40, support bracket assembly 50, and top anchor 60, may be formed of metal and/or alloy.

The components defining any adjustable leg assembly implementation may be purchased pre-manufactured or manufactured separately and then assembled together. However, any or all of the components may be manufactured simultaneously and integrally joined with one another. Manufacture of these components separately or simultaneously may involve hot forming processes such as die casting, sand casting, extrusion, forging, powder metallurgy, and/or the like, any combination thereof, and/or other like processes; cold forming processes such as cold rolling, staking, burnishing, impact extrusion, and/or the like, any combination thereof, and/or other like processes; sheet metal processes such as laser cutting, cnc, fabrication, bending, stamping, welding, and/or the like, any combination thereof, and/or other like processes; heat treatments such as annealing, tempering, direct hardening, selective hardening, diffusion hardening, stress relieving, and/or the like, any combination thereof, and/or other like processes; surface treatments such as electroplating, electroless plating, conversion coating, thin-film coating, thermal spraying, high energy treatments, and/or the like, any combination thereof, and/or other like processes; machining such as drilling, reaming, turning, milling, grinding, chip formation, and/or the like, any combination thereof, and/or other like processes; rapid prototyping such as stereolithography, laser sintering, fused deposition, solid ground curing, ink jet rapid tooling, and/or the like, any combination thereof, and/or other like processes; and any other suitable material; and/or any combination thereof.

If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

Adjustable lumber stand system 2 may be entirely or partially assembled as depicted in FIGS. 3, 4, 1, and 6 in the following manner. First, each adjustable leg assembly is assembled. This may be accomplished by coupling base anchor 40 to the base-end of first external tubular section 20 at an appropriate angle and pivotally coupling top anchor 60 to the anchoring-end portion of second internal section 30 by inserting securing pin 70 through top anchor aligning holes 62 and 36. Next, second internal section 30 is slidably engaged within first external tubular section 20 so that second internal section 30 is received at least partially within the first external tubular section 20. Then, the end portions of support arm 52 and brace 56 may be pivotally coupled to one another by inserting securing pin 78 through aligning holes 58 and 55, followed by pivotally coupling external tubular section end portions of support arm 52 and brace 56 to first external tubular section 20 and to second internal section 30 by inserting securing pins 74 and 76 through aligning holes 54, 22, and 32 and aligning holes 59, 22, and 32 respectively. Finally, securing pin 72 is inserted through aligning holes 24 and 32.

Second, a pair of adjustable leg assemblies may be positioned adjacent one another to form adjustable lumber stand system 2 and installed adjacent a structure for supporting lumber. This may be accomplished by removably coupling top anchors 60 to the structure. An additional step may include removably coupling base anchors 40 to the ground or to a scrap piece 86 of building material (e.g. a board) on the ground. A further step may include placing the lumber on support bracket assemblies 50.

Figure 4:
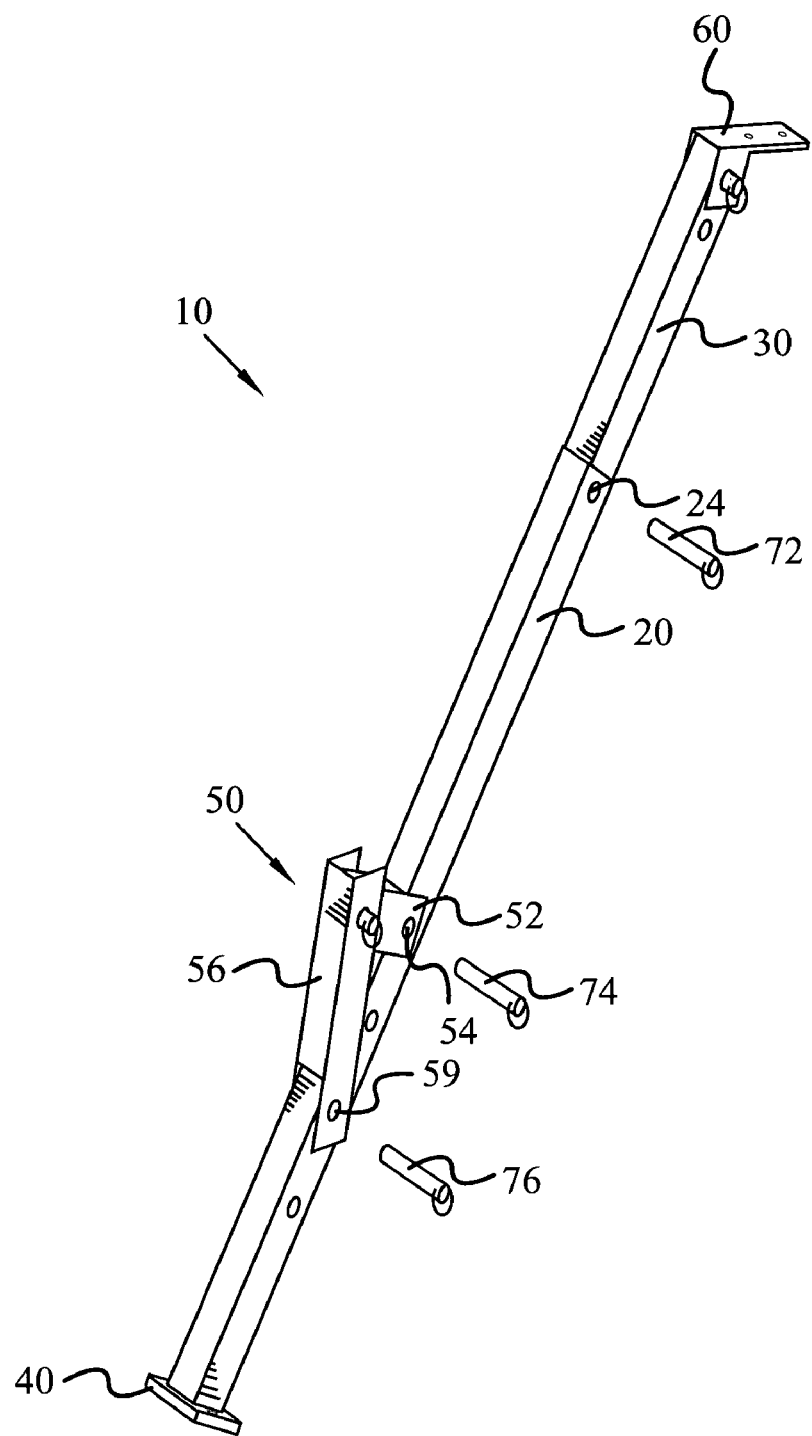

Adjustable lumber stand system 2 may be easily disassembled by reversing the foregoing assembly steps. However, as depicted in FIGS. 4 and 5, by reversing only some of the foregoing assembly steps, each adjustable leg assembly 10 may be only partially disassembled and its leg assemblies collapsed over themselves so that each adjustable leg assembly 10 is formed into a compact, easily storable unit. This may be accomplished by: removing securing pins 72 and 74; sliding second internal section 30 within first external tubular section 20 so that second internal section 30 is received fully within first external tubular section 20; folding support arm 56 and brace 52 over external tubular section 20; and then reinserting securing pins 72 and 76 into aligning holes 24 and 22 and 32 respectively.

While the assembly and disassembly of adjustable lumber stand system 2 has been described in a particular sequence of steps with reference to the drawing figures, it will be understood that the assembly and disassembly of adjustable lumber stand system 2 is not limited to the specific order of steps as disclosed. Any steps or sequence of steps of the assembly and disassembly of adjustable lumber stand system 2 indicated herein are given as examples of possible steps or sequence of steps and not as limitations, since various assembly and disassembly processes and sequences of steps may be used to assemble and disassemble adjustable lumber stand system 2. Other adjustable lumber stand system implementations may be assembled or disassembled in similar manners.

3. Use

Implementations are particularly useful in the new construction or remodeling of residential and commercial buildings. However, implementations are not limited to uses relating to buildings and the like. Rather, any description relating to buildings and the like is for the exemplary purposes of this disclosure, and implementations may also be used in a variety of applications with similar results.

Figure 6:
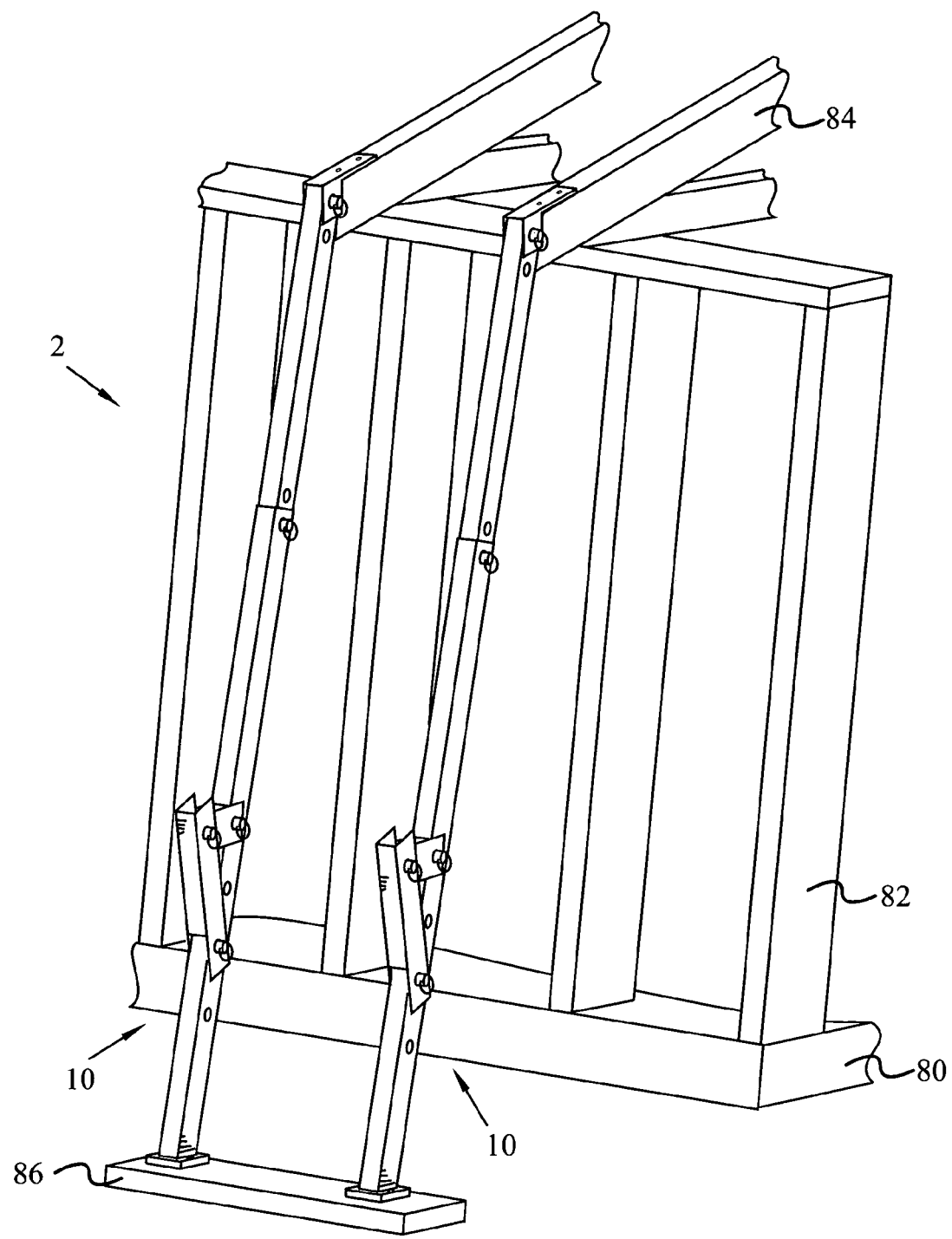
FIG. 6 is a perspective view of an adjustable lumber stand system configured according to an embodiment of the present invention during a method of installing the same adjacent a structure.
Figure 7:
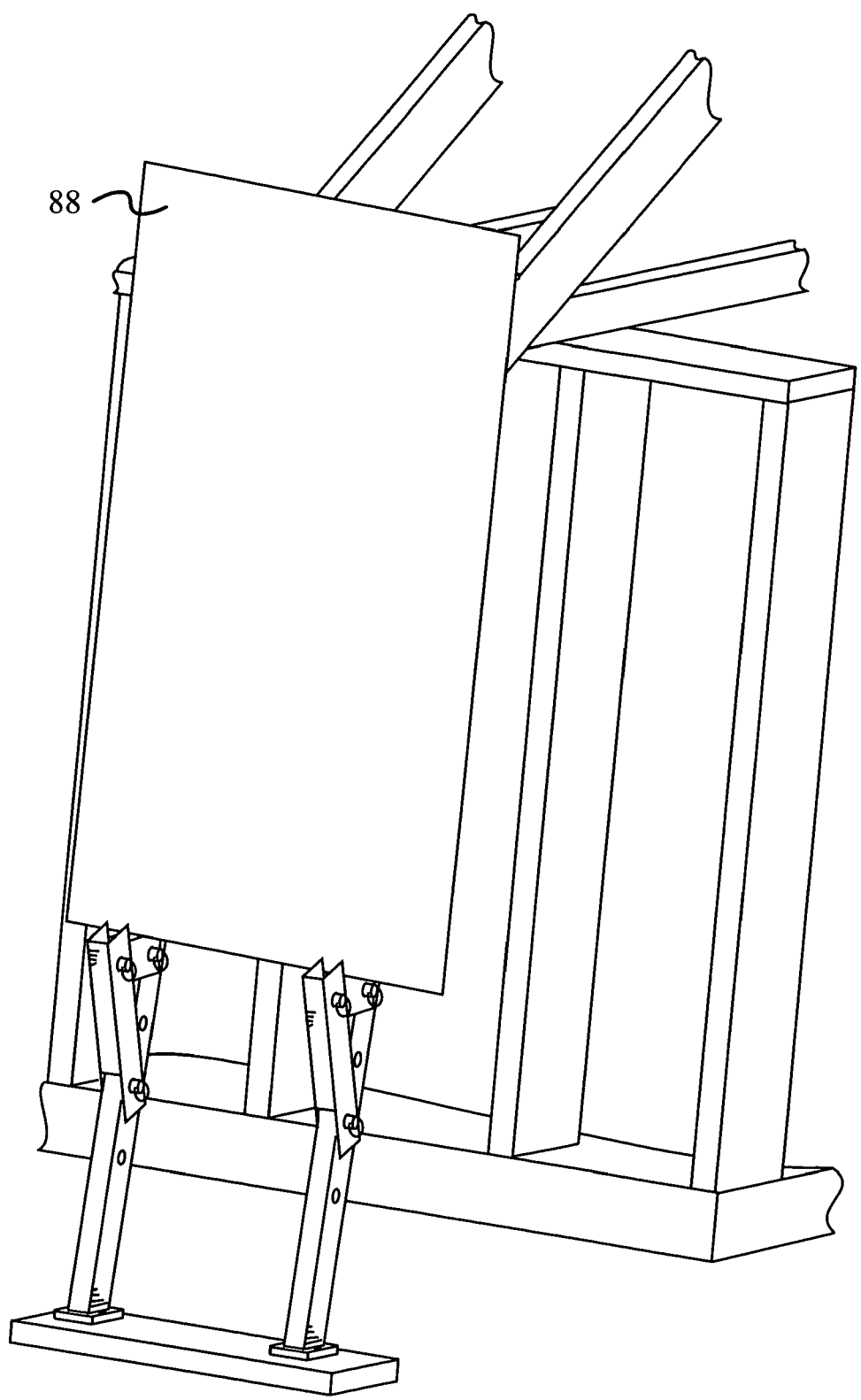
FIG. 7 is a perspective view of the adjustable lumber stand system of FIG. 6 holding and supporting sheeting.

In describing the use of implementations further, with reference to FIGS. 6-7 and for the exemplary purposes of this disclosure, adjustable lumber stand system 2 is shown installed and in use against a house under construction. During the framing stages for example, at a certain point the house includes a floor 80, walls 82, and rafters 84 and is ready for sheeting 88 to be moved from the ground and installed on rafters 80 for example.

Accordingly, as previously described in reference to FIGS. 3-5, a framer for example may remove a pair of collapsed and compact adjustable leg assemblies 10 from the back of his pick-up truck for example and assemble them into operating positions to form adjustable lumber stand system 2. The operating positions may depend upon a number of factors, including the distance from the ground to the rafters and/or the slope of the ground and/or the rafters. Adjustable leg assemblies 10 can adjust to compensate for these factors individually or together, thereby maintaining a substantially level supporting environment for sheeting 88.

A framer on the ground then can lift sheeting 88 up onto adjustable lumber stand system 2 to safely and securely hold sheeting 88 until it is needed by resting ends of sheeting 88 on support bracket assemblies 50 so that the sheeting leans against sections 20 and 30 making opposite ends of sheeting 88 available for the framer to grab. A framer on rafters 84 may now safely and easily pull and/or swing sheeting 88 up from its position on adjustable lumber stand system 2 onto rafters 84 to install it thereon. Adjustable lumber stand system 2 is very stable and will not collapse under the weight of sheeting 88, thereby creating a safe working environment.

Once all sheeting 84 has been secured to rafters 84 of the house under construction, the pair of adjustable leg assemblies 10 may easily be disassembled and collapsed over themselves into compact, easily storable units by reversing the foregoing assembly steps discussed above with reference to FIGS. 3-5. The framer may then store them in the back of his pick-up truck, only taking up a minimum amount of space and leaving plenty of room for the many other tools and supplies a framer uses on a construction site. Furthermore, if the framer is working on multiple houses under construction in a new subdivision for example, he can again quickly and conveniently remove the pair of collapsed and compact adjustable leg assemblies 10 from the back of his pick-up truck for example and assemble them into operating positions to form adjustable lumber stand system 2 at the next house under construction and not have to build a new makeshift stand for example.

What is claimed is:

1. An adjustable lumber stand system for holding and supporting lumber comprising:
    a pair of adjustable leg assemblies, each leg assembly comprising a first external tubular section into which a second internal section longitudinally slidably adjusts;
    a pair of adjustable support bracket assemblies, each support bracket assembly comprising a brace and a support arm configured to support lumber, wherein first end portions of the support arm and the brace are coupled to one another and second end portions of the support arm and the brace are coupled to different locations on the first external tubular section; and
    a pair of top anchors configured to anchor the pair of adjustable leg assemblies to a structure, each top anchor coupled to an upper end of one of the second internal sections,
    wherein the first end portions of the support arm and the brace are pivotally coupled to one another and second end portions of the support arm and the brace are pivotally coupled to different locations on the first external tubular section, and
    wherein each support arm comprises a channel larger than the first external tubular section so as to fit there over when collapsing the adjustable leg assemblies into a compact, storable unit, and wherein each brace comprises a channel larger than the first external tubular section and support arm so as to fit there over when collapsing the adjustable leg assemblies into a compact, storable unit.

2. An adjustable lumber stand system for holding and supporting lumber comprising:
    a pair of adjustable leg assemblies, each leg assembly comprising a first external tubular section into which a second internal section longitudinally slidably adjusts;
    a pair of adjustable support bracket assemblies, each support bracket assembly comprising a brace and a support arm configured to support lumber, wherein first end portions of the support arm and the brace are coupled to one another and second end portions of the support arm and the brace are coupled to different locations on the first external tubular section; and
    a pair of top anchors configured to anchor the pair of adjustable leg assemblies to a structure, each top anchor coupled to an upper end of one of the second internal sections,
    wherein the second internal section longitudinally slidably adjusts through a series of support bracket aligning holes through the first external tubular section, a series of adjusting aligning holes through the second internal section, and a plurality of securing pins, and
    wherein each support arm comprises a channel larger than the first external tubular section so as to fit there over when collapsing the adjustable leg assemblies into a compact, storable unit, and wherein each brace comprises a channel larger than the first external tubular section and support arm so as to fit there over when collapsing the adjustable leg assemblies into a compact, storable unit.

3. The system of claim 2, wherein each first external tubular section comprises about 1¼", 0.083 gauge, square tubing having a length of about 7'6" with a series of 9/32" support bracket aligning holes about 8" center to center starting from about 30" up from a base end of each external tubular section, wherein each internal section comprises about 1", 0.120 gauge, square tubing having a length of about 7'6" with a series of 9/32" adjusting aligning holes about 4" center to center starting from about 4" up from a base end of each internal section, wherein each base anchor comprises about a 2" by 4½" by ¼" plate with two 3/16" opposing spaced apart securing holes there through, wherein each support arm comprises about 1¾", 0.083 gauge, channel having a length of about 19" with two 9/32" aligning holes spaced apart about 16" center to center, with one aligning hole starting from about 2¼" up from a brace end portion of each support arm and the other aligning hole starting from about ¾" up from an external tubular section end portion of each support arm, wherein each brace comprises about 1½", 0.083 gauge, channel having a length of about 9½" with two 9/32" aligning holes spaced apart about 8" center to center, and wherein each top anchor comprises about 1½", 0.083 gauge, channel having a length of about 6" with a 9/32" aligning hole through its sidewalls and a pair of 3/16" spaced apart securing holes through a distal free end portion of its spacer.

* * * * *